United States Patent [19]

Lodi et al.

[11] 3,747,072

[45] July 17, 1973

[54] INTEGRATED STATIC MNOS MEMORY CIRCUIT

[75] Inventors: Robert J. Lodi, Tewksbury; Horst A. R. Wegener, Carlisle, both of Mass.

[73] Assignee: Sperry Rand Corporation, New York, N.Y.

[22] Filed: July 19, 1972

[21] Appl. No.: 273,260

[52] U.S. Cl. .......................... 340/172.5, 340/173 R

[51] Int. Cl. .......................... G11c 11/40, G11c 5/02

[58] Field of Search .......................... 340/172.5, 173

[56] References Cited

UNITED STATES PATENTS

| | | | |
|---|---|---|---|
| 3,641,511 | 2/1972 | Cricchi et al. | 340/173 R |
| 3,611,437 | 10/1971 | Varadi | 340/173 SP |
| 3,585,845 | 9/1968 | Ling | 340/173 R |
| 3,588,848 | 6/1971 | Van Beek | 340/173 R |
| 3,618,051 | 11/1971 | Oleksiak | 340/173 R |
| 3,579,204 | 5/1971 | Lincoln | 340/173 R |

*Primary Examiner*—Raulfe B. Zache
*Assistant Examiner*—Mark Edward Nusbaum
*Attorney*—Howard P. Terry

[57] ABSTRACT

A memory array employs individual variable threshold MNOS transistors as memory cells. A decoder employs a binary coded address signal to select a desired word in the memory. A decoder buffer translates the output of the decoder into the true or complement of the output signal of the buffer and places the resulting signal on the gate electrode of the variable threshold MNOS transistors constituting a given word line. A READ/-WRITE contact receives a signal that determines the mode of operation of the memory. An input/output buffer at the end of each bit line in the memory array converts an input signal into an inhibit or WRITE signal in response to a control signal passed through a control section when the READ/WRITE circuit receives a signal suitable for switching the memory into the WRITE mode. If the signal on the READ/WRITE contact has switched the circuit into the READ mode, the input-/output buffer serves to gate output current to exterior circuits. The control section also provides suitable substrate voltages to the memory array.

6 Claims, 2 Drawing Figures

United States Patent [19]
Lodi et al.
[11] 3,747,072
[45] July 17, 1973
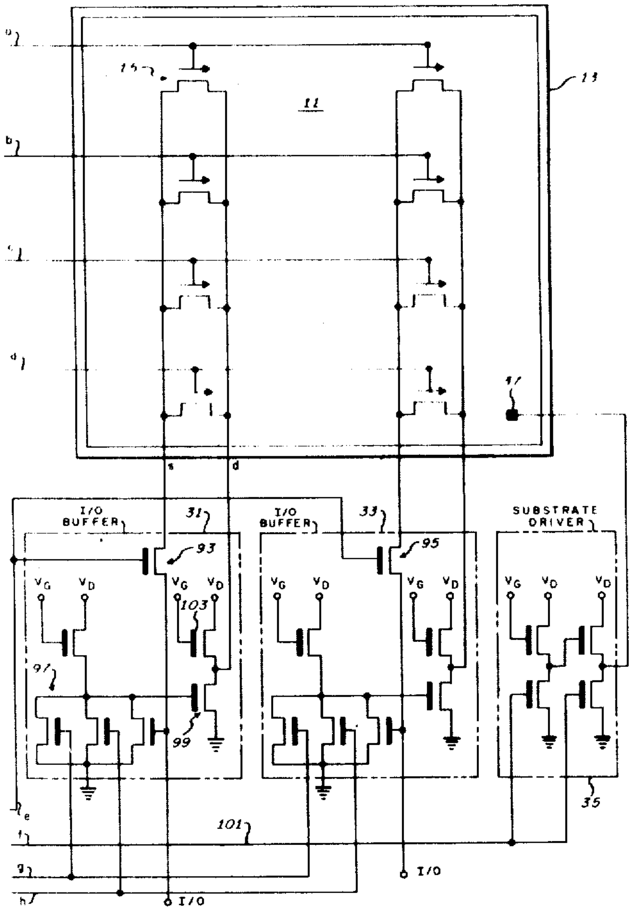

PATENTED JUL 17 1973 3,747,072

INTEGRATED STATIC MNOS MEMORY CIRCUIT

BACKGROUND OF THE INVENTION

1. Field of the Invention

This invention relates to computer memory circuits and more particularly to memory circuits employing variable threshold MNOS transistors as memory cells.

2. Description of the Prior Art

Variable threshold transistors that display memory characteristics are known in the prior art. U.S. Pat. No. 3,590,337 issued to H. A. R. Wegener on June 29, 1971 and assigned to the present assignee, for instance, concerns a plural dielectric layer MNOS field effect transistor whose conduction threshold may be altered by the application of a relatively large WRITE voltage. The threshold remains in the altered condition until the transistor is subsequently subjected to a different WRITE voltage. The condition of the threshold may be determined by subjecting the transistor to a READ voltage having a magnitude less than that of the previously applied WRITE voltage.

A variety of memory circuits have been devised in which variable threshold transistors are used as memory cells. These circuits usually require the application of pulses of both polarities for their READ and WRITE functions. However, this requires dual polarity voltage or pulse sources which entails additional circuit complexity. Furthermore, known prior art circuits usually require an external current source for use in the READ mode of operation and clock sources for precise timing. The use of these external sources again increases the complexity and bulk of the overall memory circuit.

The circuit of the present invention inherently provides a current sensible output, eliminates the need for a clock source, and requires voltage levels of only one polarity.

SUMMARY OF THE INVENTION

Each of the READ and WRITE functions of the memory of the present invention is accomplished in two distinct steps. During the WRITE mode of operation, a "clear" step sets each memory cell in a given word to its less negative threshold voltage level. Information is then written into the memory cells of that word by simultaneously applying a negative potential to the gate electrodes of the selected word and inhibit voltages to those bits in the selected word that are to remain in the clear condition.

During the READ mode of operation, a preliminary clear voltage is applied to the memory cells that generates a small shift of the affected threshold voltages so as to counteract the effect of the opposite shift in threshold voltage that will occur during the actual readout of the information.

BRIEF DESCRIPTION OF THE DRAWING

The single FIGURE comprised of *1a* and *1b* is a diagram illustrating a circuit that may be used in practicing the invention.

DESCRIPTION OF THE PREFERRED EMBODIMENT

Figure 1A:
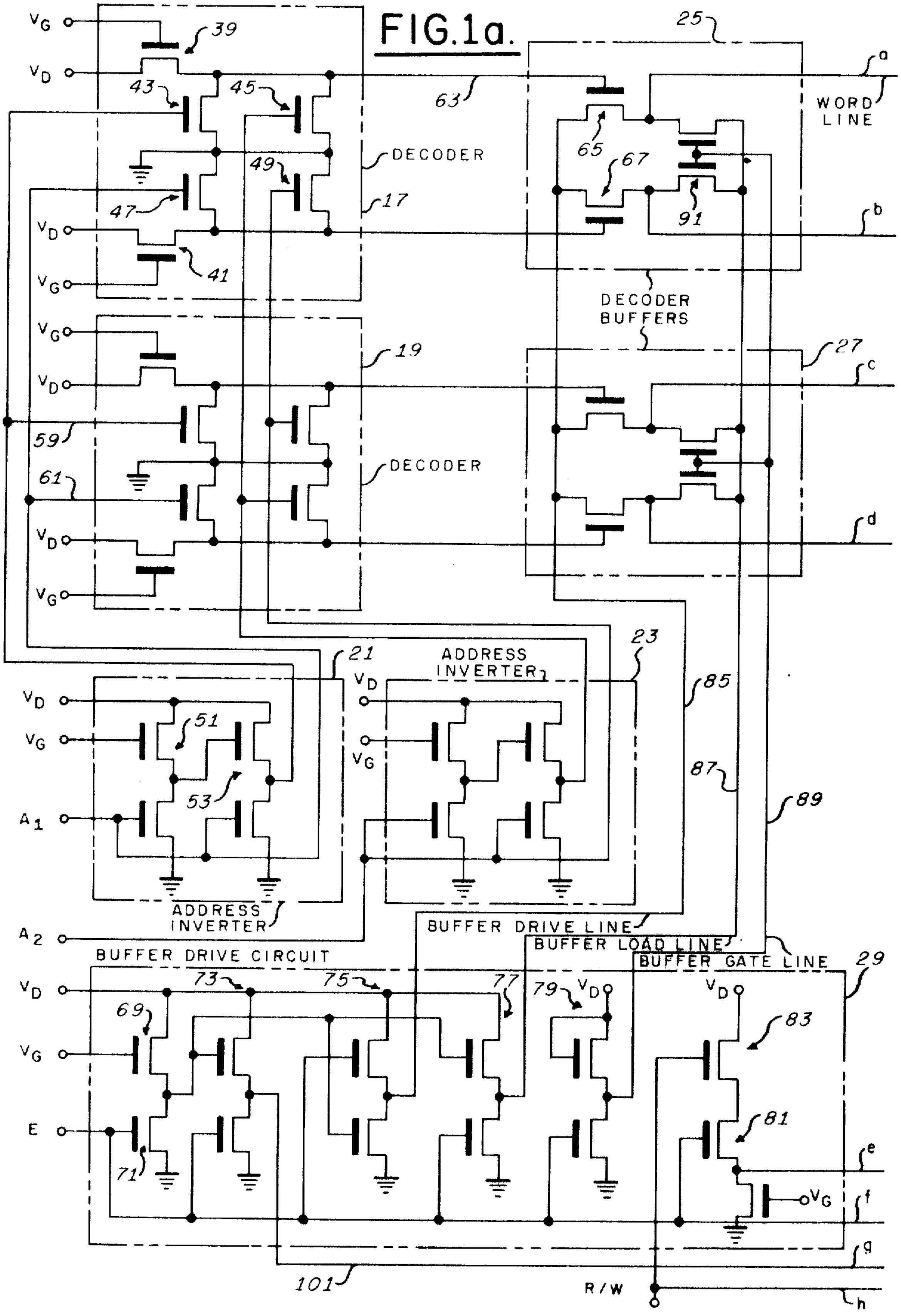
Figure 1B:
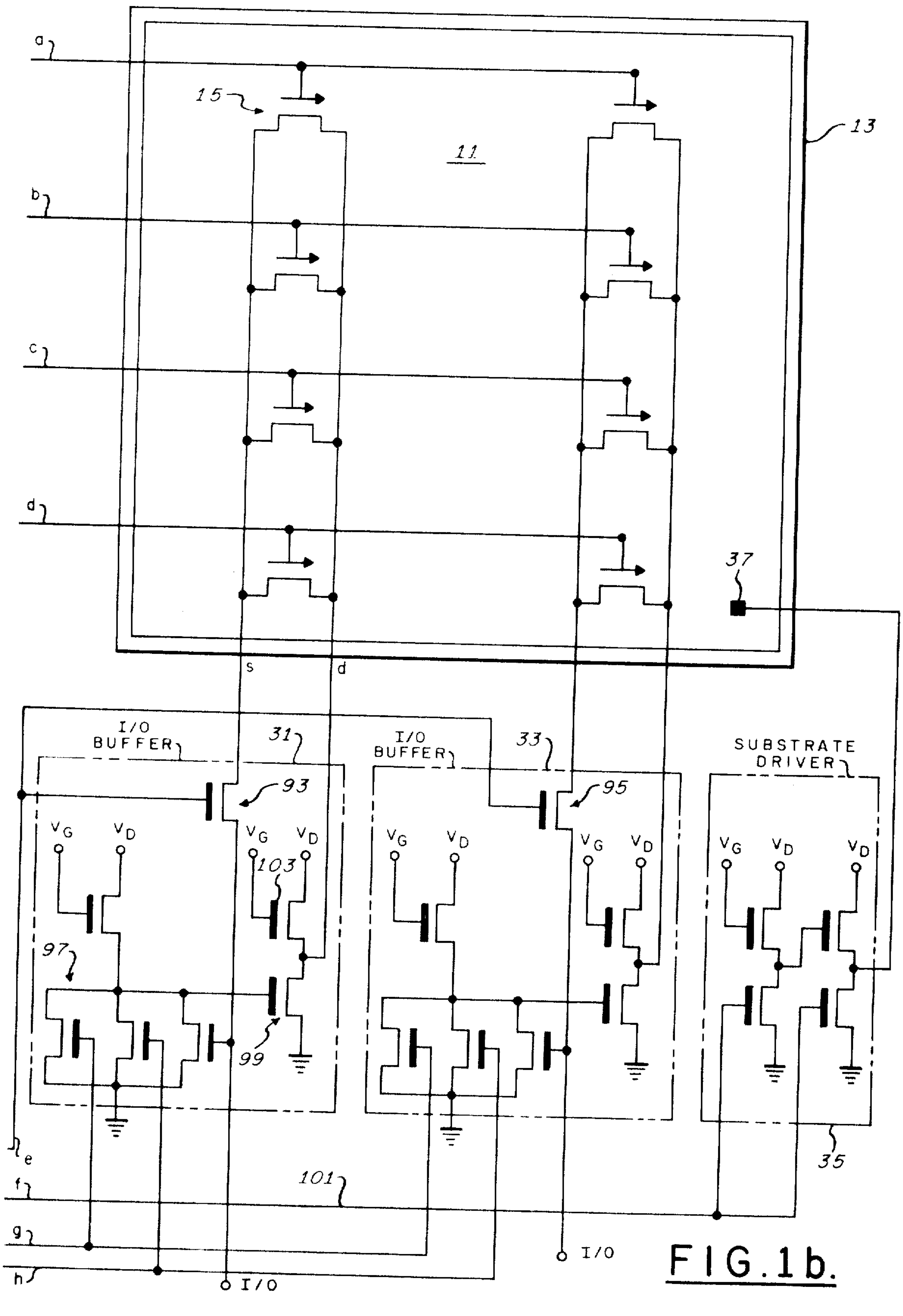

The organization and operation of a circuit employing the principles of the invention may be understood by referring to the FIGURE. A memory array 11, arranged on a substrate 13, contains a plurality of variable threshold transistor memory cells such as the cell

15. The cells are arranged in horizontal rows and vertical columns. The individual memory cells in a given row represent the various bit positions in a given word. Although the memory array depicted in the FIGURE contains only four words and two bits per word, it will be appreciated that in a typical memory array many more memory cells would be used. A typical array, for instance, might contain 128 words and 10 bit positions per word.

Access to the top two rows is gained through a decoder unit 17 whereas access to the two bottom rows is gained through a corresponding decoder unit 19. An individual row is selected by applying suitable digital address signals $A_1$ and $A_2$ to the address inverters 21 and 23 respectively. The address inverters convert the single address bits into two-rail bits, which the decoder units require for their operation. The output signals from the decoder units 17 and 19 are translated by the decoder buffers 25 and 27 into the true or complement of the corresponding decoder output signal which is then placed onto the gate electrodes of each memory cell constituting a given word line. The decoder buffers 25 and 27 provide either a positive or negative potential across a selected word line as determined by a control signal E. The control signal and a READ/WRITE (R/W) signal are applied to the buffer drive circuit 29. The circuit 29 functions as a control circuit that determines the mode of operation of the system.

The memory array itself is a two-dimensional array in which the variable threshold transistors in each row have their gate electrodes connected to a common word line. Furthermore, the source electrodes of the variable threshold transistors in a given bit column are connected through a common bus, and the drain electrodes of the same transistors are connected together through a second common bus. The array itself is isolated electrically by a reverse bias junction from the other circuit elements of the silicon chip.

Input/output (I/O) buffers 31 and 33 are connected to the bottom of each bit line. When the circuit is operating in the WRITE mode in response to a signal applied to the R/W terminal of the buffer drive circuit 29, an inhibit voltage applied to a I/O terminal will prevent a threshold shift in the memory cells of the corresponding bit column.

On the other hand, if the circuit is operating in the READ mode, the I/O buffer circuits serve to gate the output current through the memory transistor to the corresponding I/O terminal from which the signal may be applied to exterior utilization circuits.

Another signal from the buffer drive circuit 29 is used to actuate a substrate driver circuit 35 which applies a suitable bias signal to the substrate 13 through a terminal 37.

Considering the individual units in the memory system in more detail, it will be noticed that each of the transistors in the various units is a field effect device so that each of these transistors may be fabricated readily by standard techniques. The various transistors in the control sections require only a common gate voltage $V_G$ and a common drain voltage $V_D$. Typically, these voltages are in the order of negative 40 volts for the gate voltage and negative 30 volts for the drain voltage.

Referring now more particularly to the decoder unit 17, decoder load transistors 39 and 41 are coupled to ground through transistors 43 and 45 and through transistors 47 and 49, respectively. The decoder 19 contains an identical arrangement of transistors. Gate signals for the transistors 43 and 47 in the decoder circuit 17 as well as the corresponding transistors in the decoder 19 are derived from the address inverter 21. Gate signals for the remaining decoder-driver transistors are derived from the address inverter 23.

The address inverter 21 contains a first pair of inverting transistors 51 and a second pair of inverting transistors 53. A binary coded address signal $A_1$ may be applied to the decoder drive transistor 47 in the decoder 17 through a line 57. The complement of this signal will be formed by the address inverter 21 and applied to the decoder drive transistor 43 through the line 55. The same signals are applied to the corresponding transistors in the decoder circuit 19 through the lines 61 and 59.

The second address inverter 23 responds to digitally coded address signals $A_2$ and provides gate signals for the decoder drive transistors 45 and 49 in the decoder 17 and the corresponding transistors in the decoder 19. An address signal $A_2$ is applied directly to the gate electrode of the transistor 49 in the decoder 17 while at the same time the complement of this signal is applied to the gate electrode of the corresponding transistor in the decoder 19. The complement of the address signal $A_2$ is also applied to the gate electrode of the transistor 45 in the decoder 17.

The signals from the address inverters 21 and 23 have magnitudes such that they cut off conduction in the associated decoder driver transistor in one binary state and turn on the same transistor in the second binary state. When both of the decoder drive transistors coupling a given decoder load transistor to ground are in the non-conducting state, the entire voltage $V_D$ is applied to the associated decoder buffer circuit. When either of these decoder drive transistors is conducting, essentially zero voltage is applied to the decoder buffer circuit through the associated line.

In summary, the decoder circuits operate as a matrix organized so that each possible combination of binary address signals $A_1$ and $A_2$ serves to apply a voltage $V_D$ on a uniquely defined line interconnecting the decoders and the decoder buffers.

The organization and operation of the remaining units in the control system may best be appreciated by considering the various modes of operation of the system.

Consider first the clear cycle, in which all of the selected memory transistors are set to the same value. During this cycle, the input signal E is set to zero volts and the R/W terminal is similarly set to zero volts. Typically, the address signals $A_1$ and $A_2$ are set to a combination of zero volts or negative 30 volts so as to select a desired word in the memory.

Assume now that both address signals $A_1$ and $A_2$ are at negative 30 volts. The complement of these signals or zero volts will be applied to the gate electrodes of the transistors 43 and 45 so that the voltage $V_D$ can be applied to the buffer circuit 25 through the transistor 39 by means of the decoder output lines 63. It can readily be shown that one of the decoder drive transistors associated with each of the remaining decoder output lines will be turned on in response to the aforementioned address signals so that each of these remaining decoder output lines will be at ground potential.

The voltage $V_D$ will drive the buffer drive transistor 65 in the decoder buffer 25 into its conductive state. The companion buffer drive transistor 67 in the same decoder buffer will be cut off since the gate voltage applied to that transistor is zero. The corresponding buffer drive transistors in the decoder buffer 27 will also be non-conducting since their gate voltages are also at zero level.

During this time, it will be remembered that the control voltage E is at zero level. This voltage is applied to the inverting transistor pair comprising the transistors 69 and 71. The zero level gate voltage applied to the transistor 71 maintains this transistor in the non-conducting state whereas the voltage applied to the inverting transistor 69 maintains this transistor in the conducting state.

The control voltage E is also applied to one of the transistors in each of the transistor pairs 73, 75, 77 and 79 as well as a transistor 81 in a transistor network 83. Furthermore, the voltage at the junction of the transistors 69 and 71 is also applied to the transistor pairs 73, 75 and 77. A buffer drive line 85 applies the voltage at the junction of the transistor pair 75 to the decoder buffer circuits 25 and 27. Similarly, a buffer load line 87 connects the voltage at the junction of the transistors in the pair 77 to the decoder buffers. The transistor pairs 75 and 77 are arranged so that substantially zero voltage is applied to the buffer drive line 85 and a high voltage is applied to the buffer load line 87 when the input voltage E is at the zero level. Furthermore, with the control voltage E at the zero level, the lower transistor in the pair 79 is non-conducting so that the entire voltage $V_D$ is applied to the buffer gate line 89.

Thus, under these conditions the buffer drive transistors 65 and 67 in the decoder buffer 25 as well as the corresponding transistors in the decoder buffer 27 are effectively connected to ground through the buffer drive line 85.

Again, assuming that the address signals $A_1$ and $A_2$ are such as to place a high voltage on the decoder output line 63 so as to select the top word line of the memory, the transistor 65 in the decoder buffer 25 will become conductive so as to effectively connect the uppermost word line to ground. The remaining word lines will be held at a high voltage level.

Simultaneously, the zero level input voltage E is applied to the substrate driver circuit 35 which inverts this signal so as to apply the voltage $V_D$ to the substrate 13.

Thus, the selected word line sees zero volts on the gate electrodes of each memory transistor in that line and a voltage $V_D$ of negative 30 volts on the substrate. This effectively places a positive potential on the gate electrodes of all of the memory transistors in the selected word line. Each of the transistors in the selected word line is thus cleared, i.e. set to a low negative threshold voltage.

It will be remembered that all of the de-selected output lines from the decoder units 17 and 19 are held at ground potential during this time. This ground potential, when applied to the gate electrode of the buffer driver transistor in the decoder buffer which prevents that buffer drive transistor from connecting ground to its word line. Under these conditions, the word line will be raised to a voltage $V_D$ through the associated buffer load transistor such as the transistor 91 in the decoder buffer 25.

It will further be recalled that during this clear cycle, the control voltage E has been maintained at a zero level. This zero level voltage when applied to the gate electrode of the transistor 81 in the buffer drive circuit opens the transistor 81 and effectively applies a zero voltage to the gate electrodes of the memory output gating transistors 93 and 95 in the I/O buffer circuits 31 and 33 respectively. This, effectively, prevents conduction through the memory output gating transistors so as to isolate the WRITE inputs. A group of input transistors 97 in the I/O buffer and a corresponding group of input transistors in the I/O buffer 33 are connected to receive signals from the buffer drive circuit. When any one of these input transistors is driven into conduction, they drive the gate electrode of the associated memory driving transistor such as the transistor 99 in the buffer 31 to ground level and cut off conduction in that memory driving transistor. Conversely, when all of the transistors in a given group are in the non-conducting state, the associated memory load transistor is driven into its conducting state. Since the drain terminals of the variable threshold memory transistors in a given bit column are connected to the associated memory driving transistor, a voltage of $V_D$ will be applied to the memory transistor when the memory driving transistor is non-conducting and a zero level voltage will be applied to the same terminals on the memory transistors when the memory driving transistor is driven into its conducting state.

Since the control voltage E is maintained at zero level during the clear operation, a voltage of $V_D$ is applied to the gate electrodes of one of the transistors in each group of input transistors. This drives the memory driving transistors such as the transistor 99 into their non-conducting state and permits a voltage of $V_D$ to be applied to the sources and drains of the various memory transistors.

During the WRITE cycle, selective writing is initiated by applying a control voltage E of negative 40 volts to the buffer drive circuit. This, in turn, applies a voltage of $V_D$ to the buffer drive line 85 and drops the voltage on the buffer load line 87 to zero. Under these conditions, the lower transistor in the pair 79 is also driven into conduction. This permits a voltage of one-half $V_D$ to be applied to the buffer gate line 89. The resulting reversal of the buffer line potentials now makes the decoder buffers function as source followers rather than as inverters as it did during the clear cycle. The half-voltage applied to the buffer gate lines during the WRITE cycle serves to provide a relatively high load resistance required when the decoder buffers are acting as followers.

With the decoder buffer acting as a source follower, the selected decoder output line will cause a voltage of −30 volts ($V_D$) to be transmitted to the corresponding memory gates of the selected word line. The decoder output lines corresponding to the remaining (non-selected) word lines, will be at zero potential. This permits the decoder buffer load transistors such as the transistor 91 to discharge each of the non-selected word lines to ground. During the same time, the negative control voltage E drives the lower transistors in the substrate driving circuits into conduction thereby discharging the memory substrate junction to ground potential. This effectively places a negative potential across the memory gates of the selected word. The high level of the control voltage E also drops the voltage level of the line 101 to ground potential and drives the associated transistors in the groups 97 of the I/O buffers into their state. The state.The conductivity of each group of input transistors in the I/O buffer can now be controlled by a voltage applied to the corresponding I/O terminals.

For example, if a negative voltage is applied to the I/O terminal associated with the I/O buffer 31, the right hand transistor in the group 97 will be driven into conduction which will, in turn, drive the memory driving transistor 99 into its non-conducting state so as to apply a voltage of $V_D$ to the source and drain electrodes of the memory transistors in the corresponding bit line. Under these conditions, a shielding channel between the source and drain will prevent the low (negative) threshold voltage generated during the clear step from changing. This constitutes an inhibit condition.

On the other hand, if a zero level voltage is applied to the input terminal I/O, the group of input transistors 97 will remain in the non-conducting state which will drive the memory driving transistor 99 into conduction so as to apply zero voltage to the corresponding memory transistors and discharge the source and drains of these transistors to ground potential. This permits the full negative potential placed on the addressed gate to become effective, and the threshold voltage of that transistor is charged to a large (negative) value.

As indicated previously, the READ and WRITE potentials on the memory gates differ only by their levels, not in their polarity or sequence. During the clear portion of the READ cycle, the control voltage E is returned to zero level. The address signals $A_1$ and $A_2$ are set to zero or to negative 15 volts. The voltages $V_D$ and $V_G$ are maintained at negative 30 volts and negative 40 volts, respectively. A voltage of negative 30 volts is also applied to the R/W terminal of the buffer drive circuit. During the clear equivalent of the READ operation, no difference with the clear operation of the writing cycle exists except for the much smaller potential which results in very small voltage shifts in the memory transistors. During the actual readout of the READ cycle, the control voltage is increased to negative 30 volts. Under these conditions, the two upper transistors in the transistor network 83 are both turned on so as to permit the voltage $V_D$ to be applied to the gate electrodes of the transistors 93 and 95 and thereby to drive these transistors into conduction. This connects the I/O terminals to the source line of the memory transistors. In addition, the voltage applied to the R/W terminal causes one of the transistors in each group of input transistors to saturate and thus turn off the corresponding memory driving transistor in each I/O buffer so as to disconnect the memory drain lines from ground.

Assume now that the memory transistor 15 is being interrogated. If the threshold voltage on this memory transistor is low, the memory load transistor 103 in the I/O buffer 31 will cause a current to pass through the memory transistor and the gating transistor 93 to the associated I/O contact. On the other hand, if the threshold voltage of the memory transistor 15 remains at a high level, this threshold will be higher than the potential placed on its gate during readout. The memory transistor 15 will not be turned on under these conditions and no current can flow to the terminal I/O. Thus current generated within the memory system itself will be available for exterior utilization at the output terminals I/O. It will be noticed that only negative voltages were used during the entire READ/WRITE operation. There is no need for voltages of both polarities. The sequence of applying the various voltages during the READ and WRITE operations is immaterial. Therefore, the system does not require elaborate clock arrangements to provide sequencing.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A digital memory comprising an array of variable threshold transistor memory cells formed on a substrate and arranged in word rows and bit columns, each of said cells having gate, source, and drain electrodes;

a. terminal means for receiving externally generated address, control, READ/WRITE, and inhibit signals;
b. word address matrix means for actuating the gate electrodes of a single row of memory cells selected in accordance with an address signal;
c. first means for applying bias voltages to said substrate;
d. second means for applying drain voltages to the memory cells in individual bit columns;
e. means to clear individual word rows, including:
 1. decoder buffer means responsive to a zero level control signal for applying a zero level voltage to the gate electrodes in the row of memory cells selected by said matrix and a high level voltage to the gate electrodes of the remaining memory cells;
 2. means in said first means for providing a substrate voltage equal to said high level voltage in response to said zero level control signal;
f. means to write information into said array in response to a specified large control signal, including:
 1. means in said decoder buffer means for applying a gate voltage equal to said high level voltage to the gate electrodes in the row of memory cells selected by said matrix and a zero level voltage to the gate electrodes of the remaining memory cells:
 2. means in said first means for providing a zero level substrate voltage in response to said specified large control signal;
 3. said second means being responsive to individual inhibit signals corresponding to each bit column and arranged to supply high level drain voltages to the memory cells in those bit columns receiving inhibit signals and zero level drain voltages to the memory cells in those bit columns not receiving inhibit signals;
g. means to read information out of said array in response to a specified intermediate value control signal and a received READ signal, including:
 1. means in said decoder buffer means for applying an intermediate level voltage to the gate electrodes in the row of memory cells selected by said matrix and a zero level voltage to the gate electrodes of the remaining memory cells:
 2. means in said first means for providing a zero level substrate voltage in response to said intermediate value control signal;
 3. means in said second means for providing high level drain voltages in response to said intermediate level control signal, said second means further containing means for connecting the source electrodes of the memory cells to exterior utilization apparatus.

2. The memory of claim 1 wherein said address signals include a plurality of binary signals coded so that a different combination is available for each row of memory cells and said matrix means includes decoder means having an individual output line corresponding to each row of memory cells, said output line being coupled to said decoder buffer means, said decoder buffer means including switching transistor means for modifying the signals in said output lines in response to said control signals, said switching transistor means being further arranged to apply the modified signals to the gate electrodes of the memory cells in the corresponding row of cells.

3. The memory of claim 2 in which said switching transistor means includes a buffer driver transistor connected in series relationship with a buffer load transistor for each row of memory cells, said buffer driver transistor having a gate electrode connected to the corresponding output line from said decoder means, the junction of said driver and load transistors being connected to the gate electrodes of a corresponding memory cell, said decoder buffer means including a buffer drive means for providing drain and load voltages to all of the driver and load transistors respectively and a gate voltage to gate electrodes on all of said load transistors, respectively, said buffer drive means being arranged to supply a low level drive voltage and high level load and gate voltages in response to a zero level control voltage and a high level drive voltage, a low level load voltage and an intermediate level gate voltage in response to a high level control voltage.

4. The memory of claim 3 further characterized in that said second means includes a transistor network for coupling the drain terminals of the memory cells in the corresponding bit column to a source of high level voltage, said transistor network further including a memory driving transistor for optionally connecting the same drain terminals to ground potential in response to a high level READ/WRITE or inhibit signal or in response to a zero level control signal.

5. The memory of claim 4 wherein the means for connecting the source electrodes of the memory cells to external utilization apparatus includes individual gating transistors corresponding to each of said bit columns, said gating transistors being arranged for serial connection between the source electrodes of all memory cells in the associated bit column and the utilization apparatus, said gating transistors further being arranged to saturate only in response to a combination of high level READ/WRITE and control voltages.

6. A digital memory comprising an array of variable threshold transistor memory cells formed on a substrate and arranged in word rows and bit columns, each of said cells having gate, source and drain electrodes, word addressing means for selecting a single word row to be actuated in response to received address signals, decoder means in said addressing means, said decoder means including a plurality of output lines equal in number to the number of word rows in said memory, said decoder means including means for forming a first predetermined decoder output signal on an output line corresponding to a selected word row and second predetermined decoder output signals on the remaining output lines, means for receiving externally generated control signals, first buffer means for supplying individual gate signals to each word row in said memory, each of said gate signals corresponding to a different one of the decoder output signals, said first buffer means supplying gate signals that represent the True value of the decoder output signals when a received control signal has a predetermined high value and the Complementary value of the decoder output signals when the received control signal has a predetermined low value, substrate driving means responsive to a control signal of said low value for applying a voltage to said substrate equal in value to the gate voltages applied to nonslected word rows by the same control signal, and individual input/output buffers coupled to each bit column, said input/output buffers being constructed and arranged to apply source and drain voltages to the memory cells in the associated bit column in response to externally generated control, READ/WRITE and input/output signals, means in each of said input/output buffers for applying source and drain voltages equal to said substrate voltage when and only when said control voltage has a high value and said READ/WRITE and input/output signals have a low value, further means in each of said input/output buffer means for gating out current pulses from the associated bit line memory cells when said control and READ/WRITE signals have a high value.

* * * * *